United States Patent
Martinez et al.

(10) Patent No.: US 6,870,143 B2
(45) Date of Patent: Mar. 22, 2005

(54) SYSTEM AND METHOD FOR ENCAPSULATING A PIPE

(75) Inventors: Jeff D. Martinez, Hurst, TX (US); James D. Smithey, McKinney, TX (US); Robert J. Ward, Irving, TX (US)

(73) Assignee: Basic Resources, Inc., Dallas, TX (US)

( * ) Notice: Subject to any disclaimer, the term of this patent is extended or adjusted under 35 U.S.C. 154(b) by 363 days.

(21) Appl. No.: 10/125,716

(22) Filed: Apr. 18, 2002

(65) Prior Publication Data

US 2003/0197006 A1 Oct. 23, 2003

(51) Int. Cl.⁷ .............................................. H05B 3/58
(52) U.S. Cl. .................. 219/535; 219/544; 285/21.1; 138/171
(58) Field of Search ........................ 219/535, 544, 219/633; 138/171, 170, 99, 100, 156, 157; 285/21.1, 21.2, 288.1, 373, 419

(56) References Cited

U.S. PATENT DOCUMENTS

| | | | |
|---|---|---|---|
| 1,858,101 A | 5/1932 | McAfee | |
| 2,236,913 A | 4/1941 | Merrill | 138/99 |
| 2,276,443 A | 3/1942 | Wilson | 137/78 |
| 3,117,904 A | 1/1964 | Black | 156/475 |
| 3,394,025 A | 7/1968 | McCune | 117/97 |
| 3,487,857 A | 1/1970 | Lee | 138/99 |
| 3,753,766 A | 8/1973 | Brown et al. | 117/97 |
| 4,041,720 A | 8/1977 | Lebourg | 61/110 |
| 4,047,659 A | 9/1977 | Vucic | 228/119 |
| 4,049,480 A | 9/1977 | Kutschke | 156/94 |
| 4,186,475 A | 2/1980 | Jönsson | 138/97 |
| 4,218,812 A | 8/1980 | Jönsson | 29/402.12 |
| 4,253,497 A | 3/1981 | Martin et al. | 138/97 |
| 4,257,446 A | 3/1981 | Ray | 137/368 |
| 4,342,338 A | 8/1982 | Glennie | 138/99 |
| 4,357,960 A | 11/1982 | Han | 138/97 |
| 4,413,765 A | 11/1983 | Tracy | 228/119 |
| 4,437,494 A | 3/1984 | Soper et al. | 138/97 |
| 4,486,650 A | 12/1984 | Bridgstock et al. | 219/544 |
| 4,492,095 A | 1/1985 | Brister | 62/293 |
| 4,505,295 A | 3/1985 | Quin et al. | 137/315 |
| 4,556,580 A | 12/1985 | Kamuro et al. | 427/8 |
| 4,571,488 A | 2/1986 | Reeves | 219/544 |
| 4,584,963 A | 4/1986 | Morinaga et al. | 118/663 |
| 4,610,439 A | 9/1986 | Burghardt | 269/3 |
| 4,639,580 A | 1/1987 | Johnson | 219/541 |
| 4,727,242 A | 2/1988 | Barfield | 219/535 |

(List continued on next page.)

FOREIGN PATENT DOCUMENTS

| | | | |
|---|---|---|---|
| DE | 297 22 603 | 4/1998 | |
| JP | 405180391 A | 7/1993 | 138/99 |
| WO | WO 99/19135 | 4/1999 | |

OTHER PUBLICATIONS

"Die Revolution im Graben!" (1 pg. Advertisement).
Pending U.S. Appl. No. 09/800,387, filed Mar. 5, 2001.

*Primary Examiner*—Fadi H. Dahbour
(74) *Attorney, Agent, or Firm*—Hunton & Williams LLP

(57) ABSTRACT

An apparatus for encapsulating a connection of a pipe for transporting a fluid is provided. The apparatus includes a first section having at least one electrocoil surface operable to sealingly engage a surface of the pipe. The apparatus further includes a second section having at least one electrocoil surface operable to sealingly engage the surface of the pipe. The second section operably sealable to the first section to encapsulate a portion of the pipe and the connection of the pipe. The apparatus further includes at least one terminal mounted on at least one of the first and second sections. The terminal operable to energize the electrocoil surfaces of the first and second sections to electrofuse the electrocoil surfaces of the first and second sections to the surface of the pipe.

60 Claims, 4 Drawing Sheets

U.S. PATENT DOCUMENTS

| | | |
|---|---|---|
| 4,770,442 A | 9/1988 | Sichler .................. 285/21 |
| 4,807,340 A | 2/1989 | Fuller et al. ............. 29/157 |
| 4,918,292 A * | 4/1990 | Nussbaum et al. ...... 219/535 |
| 4,929,817 A | 5/1990 | Mito et al. ............... 219/544 |
| 4,947,012 A * | 8/1990 | Minarovic ................ 219/535 |
| 4,994,655 A | 2/1991 | Handa et al. ............. 219/535 |
| RE33,716 E | 10/1991 | Johnson ................... 219/541 |
| 5,062,207 A | 11/1991 | Martin et al. ............. 29/890 |
| 5,101,545 A | 4/1992 | Mori et al. ............. 29/402.09 |
| 5,116,082 A | 5/1992 | Handa et al. ............. 285/21 |
| 5,125,690 A | 6/1992 | Taylor et al. ............. 285/21 |
| 5,127,116 A | 7/1992 | Greig ..................... 285/294 |
| 5,150,922 A | 9/1992 | Nakashiba et al. ....... 285/21 |
| 5,280,670 A | 1/1994 | Toomey et al. .......... 29/33 T |
| 5,321,233 A | 6/1994 | Barrett et al. ............ 219/535 |
| 5,363,541 A | 11/1994 | Toomey et al. ........ 29/890.14 |
| 5,365,977 A | 11/1994 | Goad et al. ............... 138/99 |
| 5,496,076 A | 3/1996 | Lin ......................... 285/110 |
| 5,500,510 A * | 3/1996 | Kumagai .................. 219/535 |
| 5,542,713 A | 8/1996 | Miyazaki et al. ......... 285/158 |
| 5,573,283 A | 11/1996 | Sellers et al. ............ 285/93 |
| 5,670,012 A | 9/1997 | Porfido et al. .......... 156/379.7 |
| 5,690,148 A * | 11/1997 | Ziu .......................... 138/171 |
| 5,722,463 A | 3/1998 | Smyth et al. .............. 138/170 |
| 5,730,472 A | 3/1998 | Krause et al. ............. 285/21.1 |
| 5,781,995 A | 7/1998 | Anna et al. ............ 29/890.031 |
| 5,820,720 A * | 10/1998 | Campbell ................. 285/21.2 |
| 5,895,543 A | 4/1999 | Stiles ..................... 156/274.2 |
| 5,915,420 A | 6/1999 | Dwight, Jr. et al. ......... 138/99 |
| 5,916,468 A | 6/1999 | Akiyama et al. .......... 219/544 |
| 5,951,902 A | 9/1999 | Goodman et al. ......... 219/544 |
| 6,127,662 A * | 10/2000 | Katz ....................... 219/544 |
| 6,236,026 B1 | 5/2001 | Schafstein et al. ........ 219/535 |
| 6,237,640 B1 | 5/2001 | Vanderlee ................. 138/99 |
| 6,331,698 B1 | 12/2001 | Hintzen .................... 219/535 |
| 6,407,370 B2 * | 6/2002 | Sauron et al. ............. 219/535 |

* cited by examiner

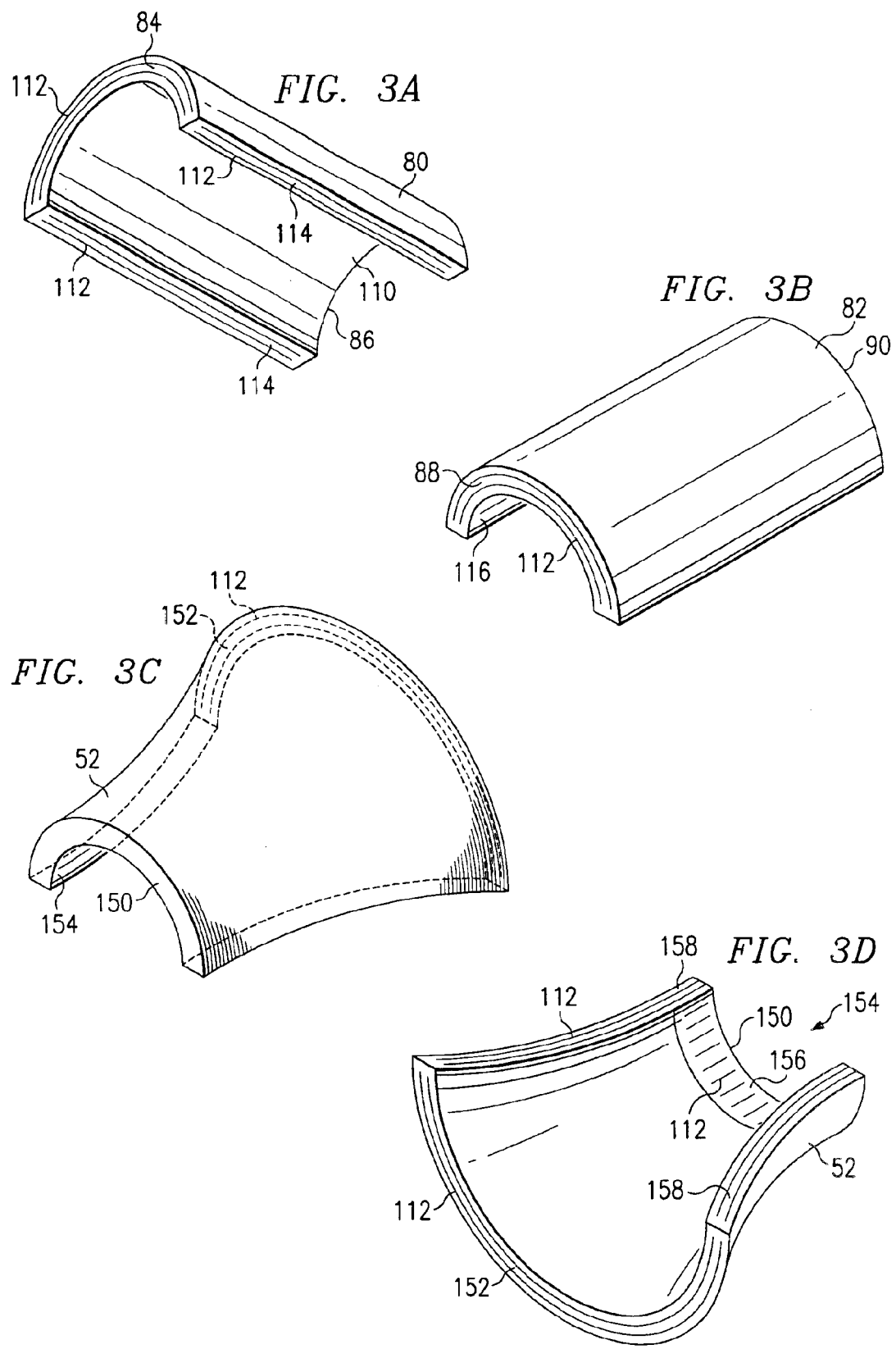

SYSTEM AND METHOD FOR ENCAPSULATING A PIPE

TECHNICAL FIELD OF THE INVENTION

The present invention relates to the field of repairing leaks in plastic pipes that transport gas or other fluids under pressure, and more specifically, but not by way of limitation, to an improved apparatus and method for repairing the leak portion of a plastic pipe fitted with a saddle tap for transporting natural gas.

BACKGROUND OF THE INVENTION

Utility distribution systems or networks, such as natural gas distribution systems, are often comprised of various pipes made of high-strength, rugged, plastic materials such as polyethylene. These various-sized plastic pipes are connected to form such a distribution network. The connections or junctions used to connect such pipes may be provided using any number of known or available techniques or arrangements. For example, a saddle tap type device may be used to connect smaller pipes to the side of a larger plastic pipe. Frequently, a saddle tap device is employed that is attached to the outer surface of a main plastic pipe and made to tap into the main plastic pipe so as to communicate the flow of fluid, such as natural gas, from within the main plastic pipe to a tributary line or pipe extending therefrom. Often such connections or junctions, including saddle taps, develop leaks that require repair.

The repair of such connections or junctions is cumbersome, time consuming, and expensive. In many cases, a large excavation is necessary to make sufficient room for clamping the main plastic pipe on both sides of the leak. Clamping is necessary to prevent the natural gas from leaking during the repair. A bypass is then constructed to allow for the continued flow of natural gas through the main plastic pipe. The squeezing is accomplished by placing a device adjacent to both sides of the connection or saddle tap that squeezes the plastic pipe to prevent the flow of natural gas therethrough.

The squeezing process, however, is often only allowed when the plastic pipe diameter is six inches or less. In many instances, the squeezing process is not practicable. Squeezing pipe with a diameter greater than six inches is normally considered ineffective at controlling the leaking natural gas, and may cause damage or stress at the pinch point of the plastic pipe. Such weakening of the plastic pipe may create a safety hazard after multiple squeezings.

Since squeezing the pipe may weaken the pipe, the squeeze points must be marked for future reference thereby leaving the marked areas unusable for future squeezing due to safety concerns.

Additional repair considerations of plastic pipe connections or junctions are well known. These include, for example, cutting out the damaged connections or junctions, removing burrs and shaving the repaired portions of the pipes, preparing pipe ends, attaching new pipes with collars, installing alignment clamps or jigs, opening squeezers to purge air from the pipes, opening both squeezers, rounding squeeze points, marking squeeze points, and fusing a bypass to the pipe.

Thus, it is readily apparent that the current method for repairing leaks in plastic pipes fitted with saddle taps for transporting natural gas under pressure is a lengthy and time consuming process that suffers from various disadvantages.

SUMMARY OF THE INVENTION

In one aspect, the present invention is directed to an apparatus for sealing a connection of a pipe for transporting natural gas. The apparatus includes a first section having at least one electrocoil surface operable to sealingly engage a surface of the pipe. The apparatus further includes a second section having at least one electrocoil surface operable to sealingly engage the surface of the pipe. The second section is operably sealable to the first section to encapsulate the connection of the pipe.

In one aspect, the apparatus further includes at least one terminal mounted on at least of the first and second sections. The terminal is operable to energize the electrocoil surfaces of the first and second sections to electrofuse the electrocoil surfaces of the first and second sections to the surface of the pipe.

In yet another aspect, the present invention is directed to an apparatus for sealing a leak portion of a plastic pipe fitted with a saddle tap for transporting natural gas. The apparatus includes a first section having a first end, a second end, and a substantially arcuate length extending between the first and second ends such that the substantially arcuate length is adapted to conform to the curved outer surface of the plastic pipe adjacent the saddle tap.

The first and second ends are provided with electrocoil surfaces operable to sealingly engage a surface of the plastic pipe. The apparatus further includes a second section having a first end and second end each provided with electrocoil surfaces adapted to sealably engage the surface of the plastic pipe. The second section further includes an outer shell extending between the first and second ends defining a cavity therein the second section.

The cavity of the second section having a clearance sufficient to encapsulate the plastic pipe and the saddle tap thereon the plastic pipe when the second portion is disposed about the surface of the plastic pipe. The first and second sections operably sealable to one another to encapsulate the leak portion of the plastic pipe fitted with the saddle tap.

In another aspect, the apparatus is further provided with at least one terminal mounted on at least one of the first and second sections. The terminal is operable to energize the electrocoil surfaces of the first and second sections to electrofuse the electrocoil surfaces of the first and second sections to the surface of the plastic pipe.

The apparatus is further provided with at least one lateral electrocoil surface. The second section is further provided with at least one lateral electrocoil surface such that the lateral electrocoil surfaces of the first and second sections are operable to sealingly engage one another. In yet another embodiment, the apparatus is further provided with an opening in the second section such that the opening is in communication with the cavity of the second section of the apparatus.

In yet another aspect, the present invention is directed to an apparatus for sealing a leak portion of a plastic pipe fitted with a saddle tap for transporting natural gas. The apparatus includes a first upper section, a first lower section, a second upper section, and a second lower section. The first upper section is provided with an electrocoil surface operable to sealingly engage a surface of the plastic pipe.

The first lower section is provided with an electrocoil surface operable to sealingly engage the surface of the plastic pipe such that the first upper and lower sections are adapted to matingly engage one another. The second upper section is provided with an electrocoil surface operable to sealingly engage the surface of the plastic pipe. The second lower section is provided with an electrocoil surface operable to sealingly engage the surface of the plastic pipe such that the second upper and lower sections are adapted to matingly engage one another.

The apparatus is further provided with a first barrel section and a second barrel section. The first barrel section has a first end and a second end, the first end is operable to sealingly engage the first upper section. The second end of the first barrel section is operable to sealingly engage the second upper section when the first barrel section is positioned between the first and second upper sections.

The second barrel section has a first end and a second end, the first end operable to sealingly engage the first lower section and the second end operable to sealingly engage the section lower section when the second barrel section is positioned between the first and second lower sections. In this manner, the first upper and lower sections, the second upper and lower sections, and the first and second barrel sections are operable to encapsulate the plastic pipe and the saddle tap on the plastic pipe thereby sealing the leak portion of the plastic pipe fitted with the saddle tap.

In one aspect, the apparatus may further include at least one terminal mounted on at least one of the first and second upper and lower sections and the first and second barrel sections. The terminal is operable to energize the electrocoil surfaces of the first and second upper and lower sections to electrofuse the electrocoil surfaces of the first and second upper and lower sections to the surface of the plastic pipe.

In yet another aspect, the present invention is directed to a method of sealing a leak portion of a plastic pipe fitted with a saddle tap for transporting natural gas. The method includes providing an apparatus having at least a first section having a first and second electrocoil surface operable to sealingly engage a surface of the plastic pipe.

The apparatus is further provided with at least a second section having a first and second electrocoil surfaces operable to sealingly engage the surface of the plastic pipe. The second section of the apparatus operably sealable to at least the first section to encapsulate the leak portion of the plastic pipe fitted with the saddle tap.

The apparatus further includes at least one terminal mounted on at least on of the first and second sections. The terminal operable to energize the electrocoil surfaces of the first and second sections to electrofuse the electrocoil surfaces of the first and second sections of the surface of the plastic pipe. The method includes positioning the first section adjacent the plastic pipe and the saddle tap.

The method further includes positioning the second section adjacent the plastic pipe and the saddle tap such that the first and second sections are disposed about the plastic pipe and the saddle tap so as to substantially encapsulate the plastic pipe and the saddle tap. The method further provides for energizing the terminal on the apparatus so as to electrofuse the electrocoil surfaces of the first and second sections to the surface of the plastic pipe thereby sealably encapsulating the leak portion of the plastic pipe fitted with the saddle tap.

In one aspect, the method includes providing an apparatus wherein the first and second sections of the apparatus encapsulate the plastic pipe and the saddle tap on the plastic pipe defining a cavity within the apparatus. The apparatus further includes an opening in at least one of the first and second sections such that the opening communications with the cavity of the apparatus.

One advantage of the present invention is the speed and resulting time-savings provided by sealingly encapsulating the plastic pipe as compared with conventional repair techniques. Thus, the present invention reduces the loss or fluid passing through the pipe, reduced materials and man-hours for making the repair, reduces the outage time in the event the plastic pipe is transporting, for example, natural gas. Another advantage is that the plastic pipe is not subjected to the clamping or crimping of conventional techniques that causes unnecessary stress or wear on the pipe. Additionally, the present invention is not limited by the diameter of the pipe as are conventional techniques, for example, that require clamping and bypassing.

Other objects, features, and advantages of the present invention will be apparent to those skilled in the art from the following detailed description when read in conjunction with the accompanying drawings and appended claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which:

FIG. 3A as a perspective view, in greater detail, of a first barrel section of the apparatus shown in FIG. 2;

FIG. 3B is another perspective view of the barrel section shown in FIG. 3A;

FIG. 3C is a perspective view, in greater detail of a first upper section of the apparatus shown in FIG. 2;

FIG. 3D is another perspective view of the first upper section shown in FIG. 3C;

DETAILED DESCRIPTION OF THE INVENTION

It should be understood at the outset that although exemplary implementations of the present invention are illustrated below, the present invention may be implemented using any number of techniques whether currently known or in existence. The present invention should in no way be limited to the exemplary implementations, drawings, and techniques illustrated below, including the exemplary designs and implementations illustrated and described herein.

Figure 1:
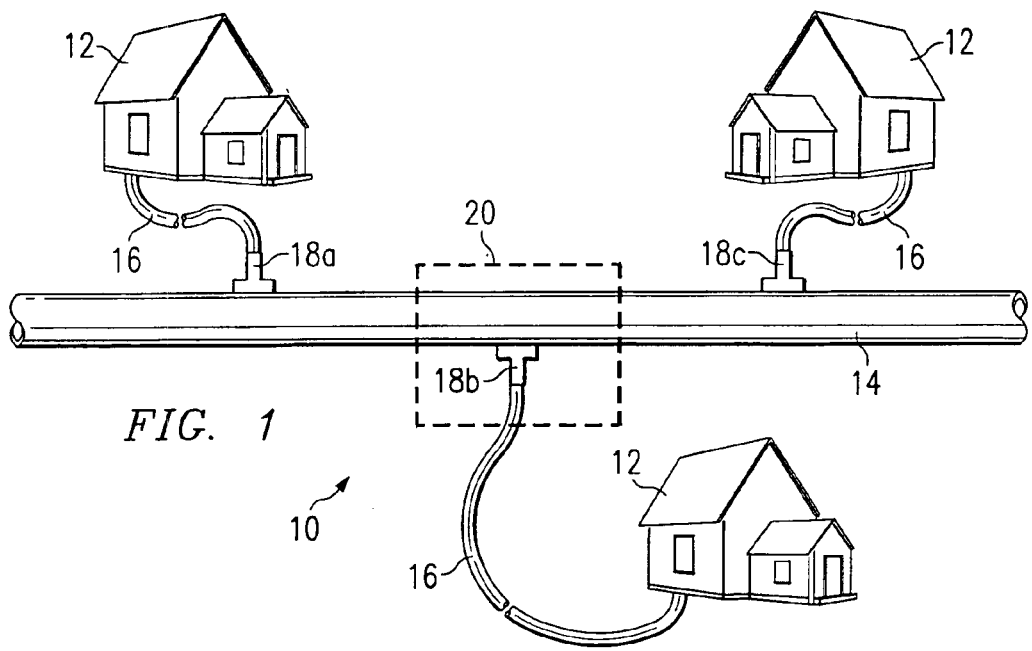
FIG. 1 is a representation of a gas distribution system wherein the apparatus of the present invention may be employed.

FIG. 1 illustrates a distribution system 10 for transporting natural gas to a plurality of customers 12 using natural gas. The distribution system 10 includes a plastic pipe 14 used to transport the natural gas to the customers 12 via a plurality of supply lines 16. The plastic pipe 14 may be composed of high strength plastic, such as polyethylene or other plastic suitable for transporting natural gas under pressure. Polyethylene is preferable since it is well adapted for electrofusing and suitable for receiving a device by electrofusion. The plastic pipe 14 may be buried at a depth suitable to satisfy safety standards for transporting natural gas under such conditions.

The supply lines 16 are shown connecting to the plastic pipe 14 via a plurality of saddle taps 18. A common connection or junction between plastic pipe may be made using any available technique or arrangement. In one embodiment, such a connection or junction may be made using a saddle tap. The use of the term "saddle tap" anywhere herein should be understood to refer to any type of connection or junction between two or more plastic pipes.

The saddle taps 18 are substantially similar in construction and function and have been denoted alphanumerically 18a, 18b, and 18c for purposes of clarity herein. Saddle taps, such as the saddle taps 18 noted herein, are well known devices useful for connecting a supply line, such as supply lines 16, to a main distribution pipe, such as the plastic pipe 14. The saddle taps 18 are connected to the plastic pipe 14 by a well known method of electrofusing the saddle tap 18 to the plastic pipe 14 and providing an opening in the plastic pipe 14 such that the natural gas supply within the plastic pipe 14 is communicated to the supply line 16 which connected to one end of the saddle tap 18. This method of connecting supply lines 16 to a main distribution line, such as the plastic pipe 14 is useful for this purpose. As previously noted, however, the connection between the saddle tap 18 and the plastic pipe 14 or the supply line 16 frequently become corrupted and leaking natural gas results. Also, the plastic pipe 14, at or near the saddle tap 18 may become corrupted, or the saddle tap 18 itself may develop a leak.

In any event, leaking natural gas whether from the plastic pipe, the saddle tap 18, or at a saddle tap 18 connection to the plastic pipe presents a dangerous and hazardous situation to the environment, as well as, the customers 12 and other bystanders. For this reason, when a natural gas leak is detected in the plastic pipe 14, it must be repaired immediately. In accordance with one aspect of the present invention, an encapsulation area 20 is identified wherein the leaking saddle tap 18b is identified as being the source of the natural gas leak. It should be appreciated that the present invention is adapted to encapsulate the leak regardless of the location of the leak, which may occur near the saddle tap 18 on the plastic pipe 14 or at the connection point of the saddle tap 18b. For the present purpose, a leaking saddle tap 18 presents a typical event encountered for which the present invention is well suited, but leaks from other locations adjacent the saddle tap are similarly repaired by the present invention. Since the plastic pipe 14 is buried under ground, an excavation is necessary to unearth the plastic pipe 14 and the connection to the leaking saddle tap 18b so as to expose them for repair.

Figure 2:
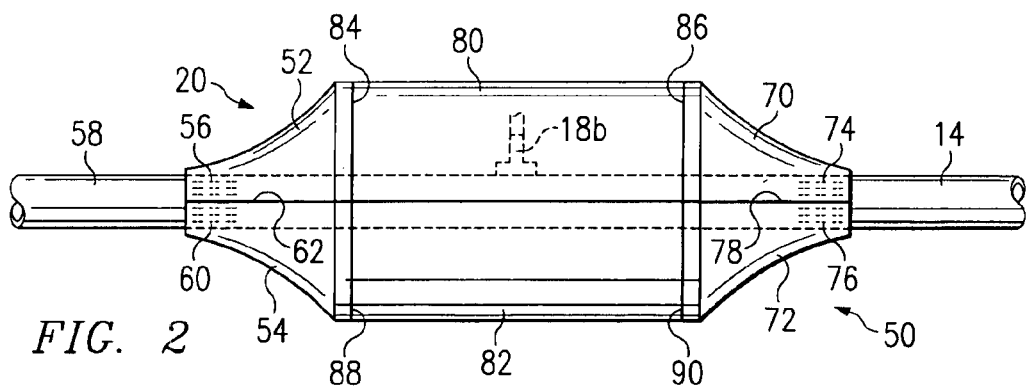
FIG. 2 is a side-elevational view of an apparatus for sealing a leak portion of a plastic pipe fitted with a saddle tap for transporting natural gas constructed in accordance with the present invention.

FIG. 2 illustrates the encapsulation area 20 in greater detail provided with an apparatus 50 constructed in accordance with one aspect of the present invention for sealing a leak portion of a plastic pipe 14 fitted with a saddle tap 18b for transporting natural gas. The apparatus 50 has a first upper section 52 and a first lower section 54. The first upper section 52 is provided with an electrocoil surface 56 operable to sealingly engage a surface 58 of the plastic pipe 14. The first lower section 54 is also provided with an electrocoil surface 60 operable to sealingly engage the surface 58 of the plastic pipe 14.

The first upper and lower sections 52 and 54 are adapted to matingly engage one another about the plastic pipe 14. The first upper and lower sections 52 and 54 may be matingly engaged along a line 62 using a variety of different methods. For example, the first upper section 52 or the first lower section 54 or both may be provided with electrocoil surfaces (not shown) operable to sealing engage with one another along the line 62. Furthermore, the engagement along the line 62 may be accomplished by belting or strapping the first upper and lower sections 52 and 54 to one another. Additionally, the first upper and lower sections 52 and 54 may be additionally provided with flanges extending along the line 62 wherein the first upper and lower sections 52 and 54 may be attached using, for example, a nut and bolt or screw configuration or any other manner of connecting the first upper and lower sections 52 and 54 to one another along the line 62 which will readily suggest themselves to one of ordinary skill in the art and which are within the spirit and scope of the present invention as described and disclosed herein.

The apparatus is further provided with a second upper section 70 and a second lower section 72. The second upper section 70 has an electrocoil surface 74 operable to sealingly engage a surface 58 of the plastic pipe 14. The second lower section 72 is also provided with an electrocoil surface 76 operable to sealingly engage the surface 58 of the plastic pipe 14. The second upper and lower sections 70 and 72 are adapted to matingly engage one anther about the plastic pipe 14.

The second upper and lower sections 70 and 72 may be matingly engaged along a line 78 employing a variety of well-known techniques. For example, the second upper section 70 or the second lower section 72 or both may be provided with electrocoil surfaces (not shown) operable to sealingly engage one another along the line 78. Such engagement may be beneficial for guaranteeing an airtight seal along the line 78 or the line 62, as previously discussed. This engagement of the second upper section 70 and the second lower section 72 may also be accomplished using a strap or belting configuration about the second upper and lower sections 70 and 72. Furthermore, the second upper and lower sections 70 and 72 may be provided with flanges extending from the second upper and lower sections 70 and 72 adjacent the line 78 for connection thereto one another. This connection may be accomplished, for example, using a standard nut and bolt configuration or a threaded screw or any other method of connecting the second upper and lower sections 70 and 72 which will readily suggest themselves to one of ordinary skill in the art and are within the spirit and scope of the present invention as disclosed herein.

The apparatus further includes a first barrel section 80 and a second barrel section 82. The first barrel section 80 is provided with a first end 84 and a second end 86. The first end 84 of the first barrel section 80 is operable to sealingly engage the first upper section 52 and the second end 86 of the first barrel section 80 is operable to sealingly engage the second upper section 70 when the first barrel section 80 is positioned between the first and second upper sections 52 and 70.

The second barrel section 82 is provided with a first end 88 and a second end 90. The first end 88 of the second barrel section 82 is operable to sealingly the engage the first lower section 54 and the second end 90 of the second barrel section 82 is operable to sealingly engage the second lower section 72 when the second barrel section 82 is positioned between the first and second lower sections 54 and 72. In this manner the first upper and lower sections 52 and 54, the second upper and lower sections 70 and 72, and the first and second barrel sections 80 and 82 are operable to encapsulate the plastic pipe 14 and the saddle tap 18b on the plastic pipe 14 thereby sealing the leak in the saddle tap 18b on the plastic pipe 14.

It will be appreciated that the apparatus 50 provides a method for quickly and easily encapsulating a leak in the saddle tap 18b on a plastic pipe 14, or adjacent the saddle tap 18b as previously mentioned, when a leak has been detected. Furthermore, employing the apparatus 50 in this manner does not in any manner damage the plastic pipe 14 as do the prior art methods of repairing leaks in plastic pipe 14 as previously discussed. Since the saddle tap 18b and the plastic pipe 14 are completely encapsulated, the saddle tap 18b may be plugged or repaired prior to this process or it may be left open since it is safely encapsulated by the apparatus 50. As such, only the supply line 16, see FIG. 1, extending from the saddle tap 18b to the customer 12 need be severed from the saddle tap 18b for encapsulating the leaking area with the apparatus 50.

The first barrel section 80 and the second barrel section 82 may be caused to engage and attach to the first upper and lower sections 52 and 54 and second upper and lower sections 70 and 72 using a variety of connecting an attachment techniques as discussed above with reference to the line 62 and the attachment of the first upper and lower sections 52 and 54. However, it should be noted that connection of the various sections of the apparatus may be accomplished using electrocoil surfaces so as to ensure an airtight seal of the apparatus 50 about the saddle tap 18b and the plastic pipe 14.

The apparatus 50 is readily adapted to receive a new saddle tap (not shown) which may be attached, for example, to the first or second barrel sections 80 or 82. In this manner, the saddle tap 18b may continue leaking and the natural gas directed out the saddle tap (not shown) on the apparatus 50. Where the saddle tap 18b is repaired, an additional opening in the plastic pipe 14 within the apparatus 50 would be made such that natural gas within the plastic pipe 14 would be communicated through the new saddle tap (not shown) for supplying natural gas to a supply line 16. This feature of the apparatus 50 further simplifies and provides for a more efficient repair and restoration of natural gas and is an additional advantage of the present invention.

FIG. 3a shows the first barrel section 80 of the apparatus 50 in greater detail. It can be seen that the first barrel section has a substantially arcuate shape extending from the first end 84 to the second end 86 and defines a cavity 110 therein the first barrel section 80. It will be appreciated that the cavity 110 of the first barrel section 80 must be of sufficient depth to provide the necessary clearance for the saddle tap 18b extending from the plastic pipe 14. However, the cavity 110 is not necessarily required to be of sufficient height from the first end 84 to the second end 86 of the first barrel section 80.

As previously discussed, the first end 84 may be provided with an electrocoil surface 112 operable for sealingly engaging the first upper section 52 of the apparatus 50. Similarly, the lower surfaces 114 of the first barrel section 80 may be provided with the electrocoil surfaces 112 for sealingly engaging the second barrel section 82.

FIG. 3b illustrates the second barrel section 82 of the apparatus 50 in greater detail. The second barrel section 82 is substantially similar in construction and configuration to the first barrel section 80 (see FIG. 3a) in that the second barrel section 82 is provided with the first end 88 and the second end 90 both of which may be provided with electrocoil surfaces 112. The arcuate configuration of the second barrel section 82 provides a cavity 116 therein. As such, when the first and second barrel sections 80 and 82 are matingly engaged with one another, the cavity 110 of the first barrel section communicates with the cavity 116 of the second barrel section.

The cavities 110 and 116 of the first and second barrel sections 80 and 82 allow sufficient clearance for the saddle tap 18b once the supply line 16 has been removed therefrom the saddle tap 18b. While the first and second barrel sections 80 and 82 are shown as substantially arcuate in shape, it will be appreciated that any number of configurations such as oval or rectangular or square may be more suitable in different instances and are within the spirit and scope of the present invention and will readily suggest themselves to one of ordinary skill in the art.

FIG. 3c shows the first upper section 52 of the apparatus 50 in greater detail. It will be appreciated that the first upper and lower sections 52 and 54 as well as the second upper and lower sections 70 and 72 are substantially similar in construction and function and for this reason only the first upper section 52 will be described herein for the purposes of clarity and brevity.

The first upper section 52 of the apparatus 50 is provided with a first end 150 and a second end 152. The second end 152 may be provided, as previously mentioned, with an electrocoil surface 112 operable for sealingly engaging the first end 84 of the first barrel section 80. In this manner, the configuration of the second end 152 of the first upper section 52 has a substantially arcuate shape conforming to the arcuate shape of the first end 84 of the first barrel section 80 (see FIG. 3a) such that the first end 84 of the first barrel section 80 and the second end 152 of the first upper section 52 substantially conform and connect so that the electrocoil surfaces 112 may be sealingly engaged with one another.

It can be seen that the second end 152 of the first upper section 52 has a larger arcuate radius than does the first end 150 of the first upper section 52. Thus, the first upper section 52 is largest at the second end 152 and tapers as it extends toward the first end 150. The first end 150 defines an opening 154 therein the first end 150 suitable for receiving a surface 58 of the plastic pipe 14 (see FIG. 2).

FIG. 3d illustrates another perspective of the first upper section 52. When the first upper section 52 is disposed about the plastic pipe 14, the surface 58 of the plastic pipe 14 is positioned within the opening 154 of the first end 150. The first upper section 52 is provided with a pipe-engaging surface 156 which is provided with the electrocoil surface 112. This construction allows the electrocoil surface 112 on the pipe-engaging surface 156 to electrofuse and sealingly engage the surface 58 of the plastic pipe 14. In this manner it will be appreciated that the pipe engaging surface 156 of the first upper section 52 creates and airtight seal about the surface 58 of the plastic pipe 14.

It is readily apparent that when a similarly constructed first lower section 54 is caused to engage the first upper section 52 about the plastic pipe 14, the first upper and lower sections 52 and 54 create an airtight engagement about the plastic pipe 14 by electrofusion at the electrocoil surface 112 to the surfaces 58 of the plastic pipe 14. The first upper section 52 is provided with lateral surfaces 158 which may be provided with electrocoil surfaces 112 operable to sealingly engage lateral surfaces 158 of the similarly constructed and denoted first lower section 54.

The first upper and lower sections 52 and 54, the second upper and lower sections 70 and 72, and the first and second barrel sections 80 and 82, may be constructed from a variety of materials such as steel or aluminum, or from a rigid plastic or polymeric material. The symmetrical relation of the components promotes construction by forming, for example, in plastic or polymeric molds the various sections of the apparatus 50. This construction may be preferable for mass manufacture to reduce the production costs as well as to guarantee uniformity of the various sections of the apparatus 50. Additionally, the electrocoil surfaces may be constructed unitarily during the construction of the various sections of the apparatus 50. The electrocoil surfaces 112 provided on various surfaces of the apparatus 50 are electrically reactive to heatably seal to polyethylene surfaces. The art of electrofusion is well known and thus no further discussion is deemed necessary to enable one of ordinary skill in the art to practice the present invention as disclosed and described herein.

Figure 4:
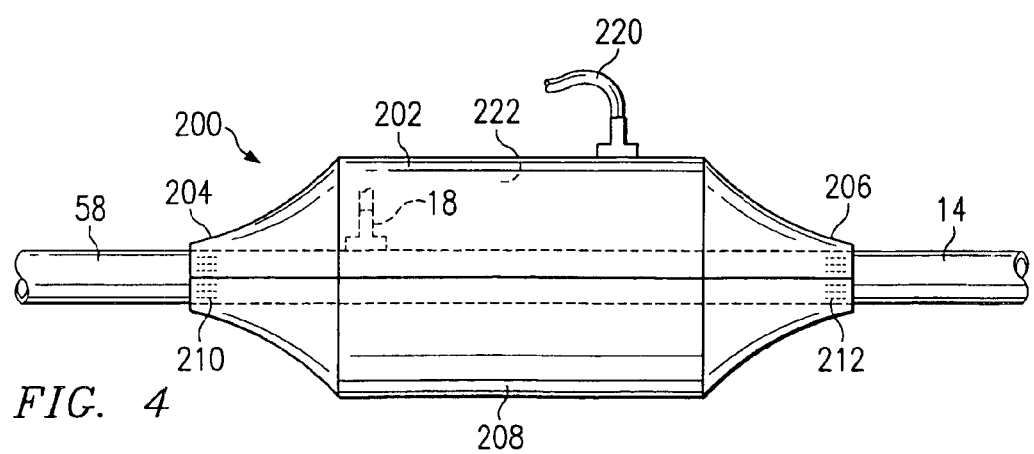
FIG. 4 is a side elevational view of another aspect of the apparatus of the present invention substantially as shown in FIG. 2 above, having a saddle tap connection thereon the apparatus.

FIG. 4 illustrates another aspect of the present invention of an apparatus 200 for sealing a leak in a saddle tap 18 on a plastic pipe 14. In this embodiment, the apparatus 200 is provided with a first section 202 which has a first and a second electrocoil surface 204 and 206 operable to sealingly engage the first section 202 of the apparatus 200 to the surface 58 of the plastic pipe 14. The apparatus 200 is further provided with a second section 208 having a first and second electrocoil surfaces 210 and 212 operable to sealingly engage the second section 208 of the apparatus 200 to the surface 58 of the plastic pipe 14.

The second section 208 is adapted to sealably engage the first section 202 such that the first and second sections 202 and 208 encapsulate the plastic pipe 14 and the leak in the saddle tap 18 on the plastic pipe 14. The first section 202 is provided with a saddle tap 220 provided thereon the first section 202. When the saddle tap 18 has been either repaired or sealed an additional invasion into the plastic pipe 14 is necessary to allow natural gas from the plastic pipe 14 to escape within the encapsulation of the apparatus 200.

In this manner, the natural gas is communicated from the plastic pipe 14 to the saddle tap 220 and may be provided to natural gas customers 12 thereby. While the saddle tap 220 is shown as disposed on the first section 220 substantially offset the saddle tap 18 on the plastic pipe 14 it will be appreciated that the saddle tap 220 may be positioned on the first section 202 so as to be directly above the saddle tap 18 or adjacent and above the saddle tap 18. In either disposition, the saddle tap 220 provides for communicating the supply of natural gas to the customer through the apparatus 200.

The saddle tap 18 may be readied for the encapsulation process by the apparatus 200 by removing the saddle tap 18, plugging the saddle tap 18, repairing the saddle tap 18, or otherwise. Additionally, where the saddle tap 18 is plugged or removed, an additional saddle tap (not shown) on the plastic pipe 14 or an invasion in the plastic pipe 14 may be necessary to communicate the natural gas within the plastic pipe 14 to the saddle tap 220.

The first and second sections 202 and 208 of the apparatus 200 encapsulate the plastic pipe 14 and the saddle tap 18 on the plastic pipe 14 defining a cavity 222 within the apparatus 200. The cavity 222 within the apparatus 200 must provide sufficient clearance to encapsulate the saddle tap 18 and may include only a chamber or channel (not shown) to direct the natural gas from the plastic pipe 14 to the saddle tap 220. It will be appreciated that the saddle tap 220 may be unnecessary when there is no need to provide natural gas to a customer along that point on the plastic pipe 14. In this event, the saddle tap 220 may be removed or sealed or the first section 202 may be provided unitarily without the saddle tap 220.

Figure 5:
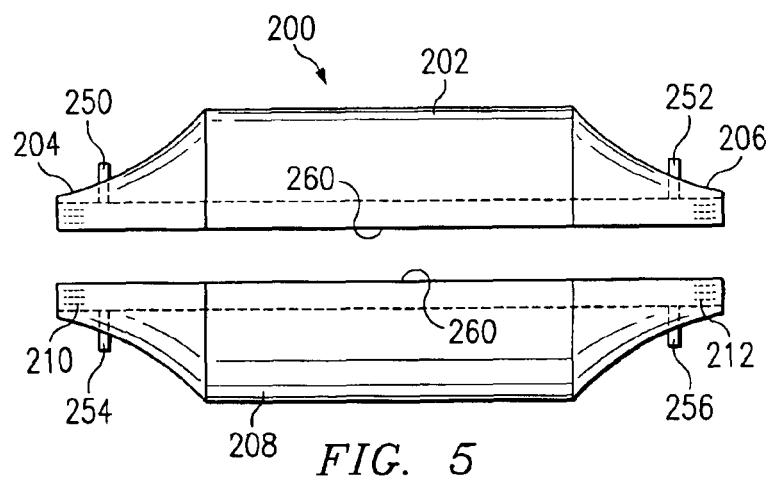
FIG. 5 is a side elevational view of another aspect of the present invention of an apparatus shown encapsulating a leak portion of a plastic pipe fitted with a saddle tap constructed in accordance with the present invention.

FIG. 5 illustrates the apparatus 200 wherein the first section 202 is provided with a first and a second terminal 250 and 252. The terminals 250 and 252 are operable to energize the electrocoil surfaces 204 and 206 of the first section 202. In this manner, an electrical appliance may be attached to the terminals 250 and 252 which transmit a current to the first and second electrocoil surfaces 204 and 206 to energize the first and second electrocoil surfaces 204 and 206 thereby electrofusing the first section 202 to the surface 58 of the plastic pipe 14. In one aspect, the present invention may be provided with only a single terminal 250 which provides an electrical current to both the first and second electrocoil surfaces 204 and 206.

The apparatus 200 is further provided such that the second section 208 is provided with a first and a second terminal 254 and 256. The first terminal 254 is operable to energize the first electrocoil surface 210 and the second terminal 256 is operable to energize the second electrocoil surface 212. In this manner, the first and second terminals 254 and 256 may receive an electrical appliance to provide electricity to energize the electrocoil surfaces 210 and 212 and electrofuse the electrocoil surfaces 210 and 212 to provide sealing engagement to the surface 58 of the plastic pipe 14.

In one aspect of the present invention, the second terminal 256 or the first terminal 254 may be eliminated such that only one terminal, for example, terminal 254 energizes both the first and second electrocoil surfaces 210 and 212 for this purpose. In yet another aspect, the present invention may be provided with only a single terminal, for example, the first terminal 250 of the first section 202 which provides and connects to the first and second electrocoil surfaces 204 and 206 of the first section 202 and the first and second electrocoil surfaces 210 and 212 of the second section 208. Therefore, providing an electrical current to only the terminal 250 energizes and electrofuses the first and second electrocoil surfaces 204, 206, 210 and 212 of both the first and second sections 202 and 208. This may be readily accomplished by providing electrical contacts between the first section 202 and second section 208 when the first and second sections 204 and 208 are brought into mating engagement.

Furthermore, the first and second sections 204 and 208 may be provided with electrocoil surfaces 260 along the lateral portions of the first section 202 and second section 208 to provide for sealing engagement by electrofusing the electrocoil surfaces 260 of the first and second sections 202 and 208 to one another. It will be appreciated that, for example, it may be unnecessary in certain instances to provide adjacent electrocoil surfaces 260 and that the electrocoil surface 260 on only the first section 202 may be sufficient to provide for sealing engagement sufficient to seal the first section 202 to the second section 208.

Figure 6:
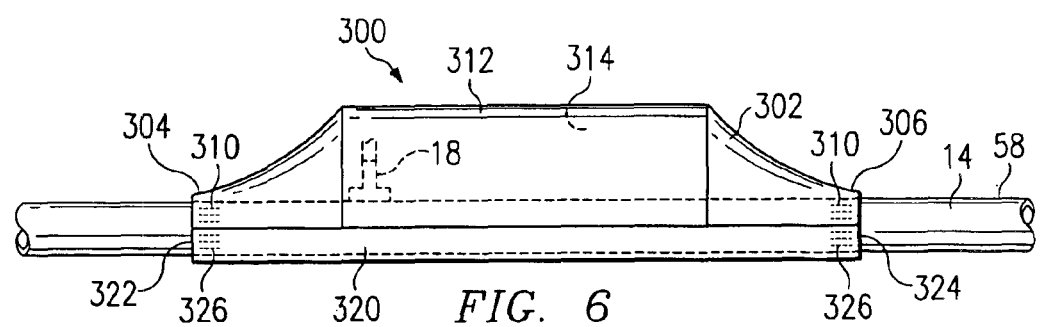
FIG. 6 is a side elevational view of yet another aspect of the present invention of an apparatus shown encapsulating a leak portion of a plastic pipe fitted with a saddle tap constructed in accordance with the present invention.

FIG. 6 illustrates yet another aspect of the present invention which provides an apparatus 300, which is substantially similar to the apparatus 200 (see FIG. 4), for sealing a leak in, for example, a saddle tap 18 on a plastic pipe 14 transporting natural gas. The apparatus 300 is provided with a first section 302 having a first end 304 and a second end 306. The first and second ends 304 and 306 are each provided with electrocoil surfaces 310 adapted to sealingly engage the surface 58 of the plastic pipe 14. The first section 302 is further provided with an outer 312 shell extending between the first and second ends 304 and 306 defining a cavity 314 therein the first section 302. The cavity 314 of the first section 302 having a sufficient clearance such that the first section is disposable over the saddle tap 18 on the plastic pipe 14.

The apparatus 300 is further provided with a second section 320 having a first end 322 and a second end 324 and a substantially arcuate length extending between the first and second ends 322 and 324. In this manner, the substantially arcuate length of the second section 320 is adapted to conform to the curved outer surface 58 of the plastic pipe 14 adjacent the saddle tap 18. The first and second ends 322 and 324 of the second section 320 are provided with electrocoil surfaces 326 operable to sealingly engage the surface 58 of the plastic pipe 14. The first and second sections 302 and 320 operable to sealably engage one another to encapsulate the plastic pipe 14 and the saddle tap 18 on the plastic pipe 14 and contain and seal any leak existing therein.

It will be appreciated that the reduced profile of the second section 320 is advantageous in that it reduces the extent of the excavation necessary to encapsulate the leak in the saddle tap 18 on the plastic pipe 14.

Figure 7:
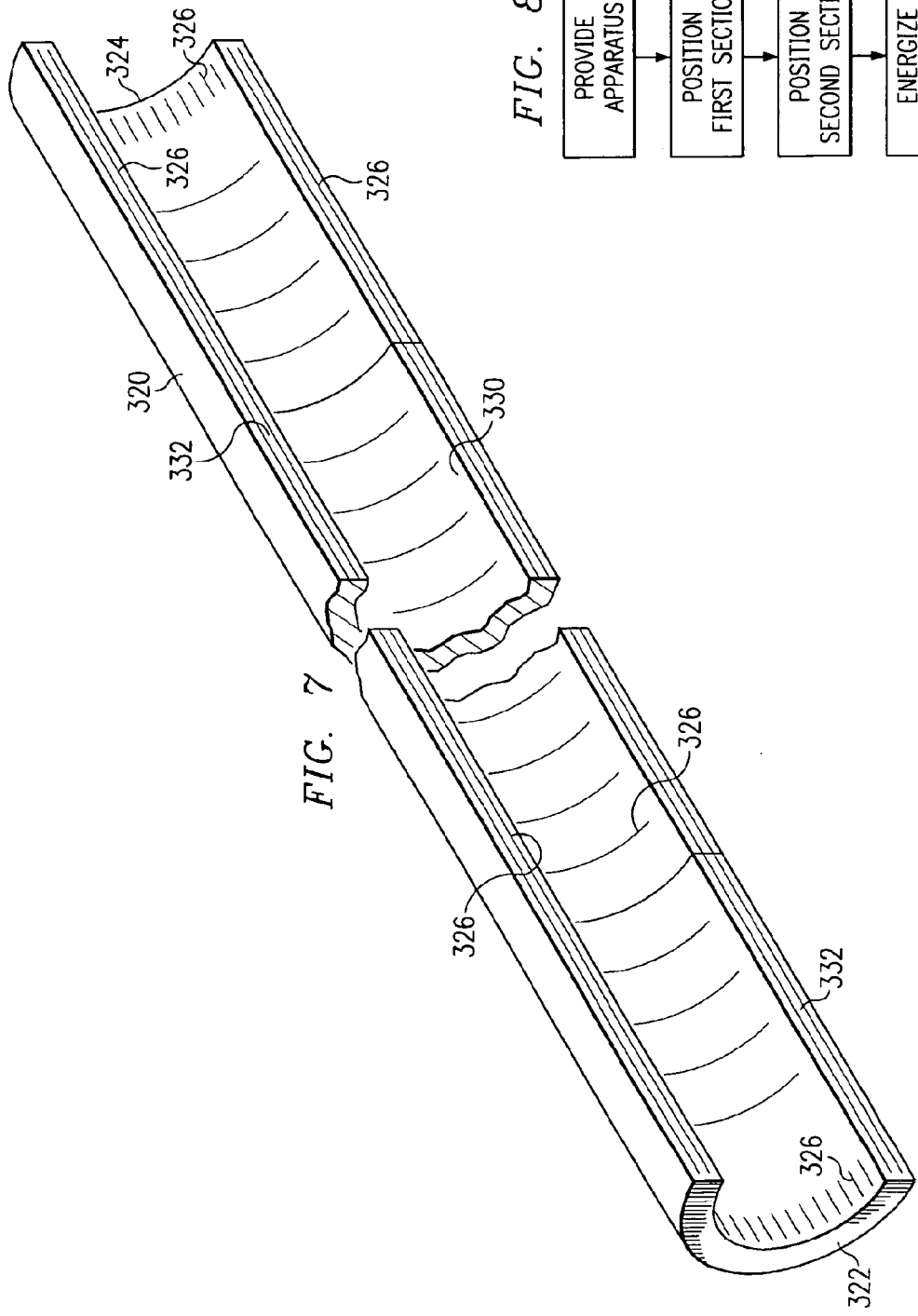
FIG. 7 is a perspective view of a second section, in greater detail, of the apparatus shown in FIG. 6.

Referring to FIG. 7, the second section 320 of the apparatus 300 is shown in greater detail. It can be seen that the substantially arcuate length extending from the first end 322 to the second end 324 of the second section 320 is well adapted to conform to the curved outer surface of the plastic pipe 14. While the electrocoil surfaces 326 located near the first end 322 and the second end 324 are shown for sealingly engaging the surface 58 of the plastic pipe 14, the inner surface 330 may be provided with the electrocoil surfaces 326 throughout the inner surface 330 so as to provide an increased engagement to ensure an airtight seal about the plastic pipe 14. Additionally, the second section 320 is shown as having contact surfaces 332 which are shown as provided with electrocoil surfaces 326 which may advantageously provide for a sealing engagement of the second section 320 to the first section 302. Additionally, the first section 302 may be similarly provided with contact surfaces (not shown) which may be provided with electrocoil surfaces 326 for similarly ensuring a sealing engagement of the first section 302 to the second section 320.

The electrocoil surfaces 326 of the apparatus 300 may be energized in a variety of manners which have been previously discussed above with reference to FIG. 5 and the terminals 250 thereon. Furthermore, the apparatus 300 may be provided with a saddle tap (not shown) similar to the saddle tap 220 shown on the apparatus 200 (see FIG. 4) for the purposes discussed with reference thereto.

Figure 8:
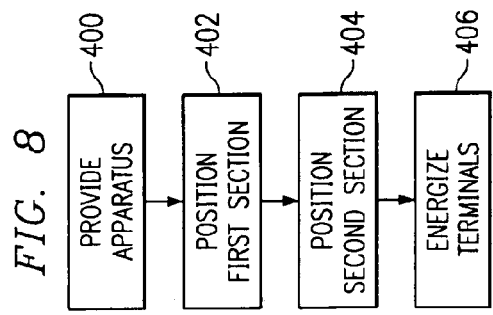
FIG. 8 is flow chart detailing a method of the present invention for sealing a leak portion of a plastic pipe fitted with a saddle tap.

FIG. 8 illustrates a method for sealing a leak portion of a plastic pipe fitted with a saddle tap for transporting natural gas. At a first block 400, an apparatus is provided which is operable to sealably encapsulate a leak portion of a plastic pipe fitted with a saddle tap, such as the apparatus 50 (see FIG. 2), the apparatus 200 (see FIG. 4), or the apparatus 300 (see FIG. 6). At this block 400, it may be necessary to excavate the site to gain access to the plastic pipe 14. Also, the supply line 16 connected to the saddle tap 18 will necessarily be disconnected therefrom. Any necessary repairs or invasions into the plastic pipe 14 should be made to obtain, when desirous, a supply of natural gas from the plastic pipe 14. Where the apparatus, such as the apparatus 200 (see FIG. 4) is provided, at the block 402 the first section 202 is positioned adjacent the plastic pipe, such as the plastic pipe 14, so as to enclose the saddle tap 18 as well.

At the next block 404, the second section 208 is positioned adjacent the plastic pipe 14 such that the first and second sections 202 and 208 are disposed about the plastic pipe 14 and the saddle tap 18 so as to substantially encapsulate the plastic pipe 14 and the saddle tap 18. At the block 406, the terminal, such as terminal 250, on the apparatus 200 are energized by employing an electrical device thereby electrofusing the electrocoil surfaces 204 and 206 of the first section 202 and the electrocoil surfaces 210 and 212 of the second section 208, thereby electrofusing the first and second sections 202 and 208 to the surface of the plastic pipe 14 as well as electrofusing the first and second sections 202 and 208 to one another. In this manner, the leak in, for example, the saddle tap 18 and the plastic pipe 14 are sealably encapsulated.

Once the leak has been encapsulated by the apparatus 200, it may be beneficial to provide an additional saddle tap connection to the apparatus 200, such as saddle tap 220 (see FIG. 4). The saddle tap 220 provided on the apparatus 200 may be then connected to, for example, the supply line 16 to provide a natural gas supply to the customer 12. As previously discussed this will require some invasion into the plastic pipe 14 so as to provide a supply of natural gas from the plastic pipe 14 to the cavity 222 and then to the saddle tap 220 attached to the apparatus 200 to provide natural gas to the customer 12.

Thus, it is apparent that there has been provided, in accordance with the present invention, an apparatus and method for repairing leak portions of plastic pipe fitted with saddle taps supplying natural gas that satisfies one or more of the advantages set forth above. Although the preferred embodiment has been described in detail, it should be understood that various changes, substitutions, and alterations can be made herein without departing from the scope of the present invention, even if all of the advantages identified are not present. For example, the various embodiments shown in the drawings herein illustrate that the present invention may be implemented and embodied in a variety ways that still fall within the scope of the present invention.

Also, the techniques, designs, elements, and methods described and illustrated in the preferred embodiment as discrete or separate may be combined or integrated with other techniques, designs, elements, or methods without departing from the scope of the invention. Other examples of changes, substitutions, and alterations are readily ascertainable by one skilled in the art and could be made without departing from the spirit and scope of the present invention.

What is claimed is:

1. An apparatus for sealing a connection of a pipe, the apparatus comprising:

a first section having an electrocoil surface operable to sealingly engage a first portion of a surface of the pipe; and a second section having an electrocoil surface operable to sealingly engage a second portion of the surface of the pipe, the second section operably sealable to the first section to encapsulate the connection of the pipe, wherein the apparatus further includes at least one terminal mounted on at least one of the first and second sections, the terminal operable to energize the electrocoil surfaces of the first and second sections to electrofuse the electrocoil surfaces of the first and second sections to the first and second portions of the surface of the pipe, wherein the electrocoil surface of the first section of the apparatus is further defined as a first end and second end electrocoil surfaces operable to sealingly engage the surface of the pipe and wherein the electrocoil surface of the second section of the apparatus is further defined as a first end and second end electrocoil surfaces operable to sealingly engage the surface of the pipe, wherein the first and second sections of the apparatus encapsulate the pipe and the connection of the pipe defining a cavity within the apparatus, and wherein the apparatus is further provided with an opening in at least one of the first and second sections such that the opening communicates with the cavity of the apparatus.

2. The apparatus of claim 1, wherein the opening is further defined as a saddle tap mounted on at least one of the first and second sections of the apparatus.

3. The apparatus of claim 2, wherein the saddle tap mounted on the apparatus is disposed adjacent the connection of the plastic pipe.

4. The apparatus of claim 2, wherein the saddle tap mounted on the apparatus is substantially offset the connection of the plastic pipe.

5. The apparatus of claim 2, wherein the first and second sections are provided with fasteners operable to sealably couple the first and second sections.

6. An apparatus for encapsulating a pipe fitted with a connection for transporting a fluid; the apparatus comprising:
   a first section having a first end, a second end and a substantially arcuate length extending between the first and second ends such that the substantially arcuate length conforms to a curved outer surface of the pipe adjacent the saddle tap, the first and second ends provided with electrocoil surfaces operable to sealingly engage a surface of the pipe; and
   a second section having a first and a second end each provided with electrocoil surfaces adapted to sealably engage the surface of the pipe, the second section further provided with an outer shell extending between the first and second ends defining a cavity therein the second section having a clearance sufficient to encapsulate the pipe and the connection of the pipe when the second portion is disposed about the surface of the pipe, the first and second sections operably sealable to one another to encapsulate the connection of the pipe.

7. The apparatus of claim 6, wherein the apparatus further includes at least one terminal mounted on at least one of the first and second sections, the terminal operable to energize the electrocoil surfaces of the first and second sections to electrofuse the electrocoil surfaces of the first and second sections to the surface of the pipe.

8. The apparatus of claim 7, wherein the pipe is polyethylene pipe.

9. The apparatus of claim 6, wherein the pipe is further defined as a polyethylene pipe.

10. The apparatus of claim 6, wherein the connection is a saddle tap.

11. The apparatus of claim 6, wherein the connection is an integrated opening in the pipe.

12. The apparatus of claim 6, wherein the connection is an opening in the pipe.

13. The apparatus of claim 6, wherein the connection is a junction of the pipe.

14. The apparatus of claim 6, wherein the connection is a connection of the pipe.

15. The apparatus of claim 7, wherein the first section is further provided with at least one lateral electrocoil surface and wherein the second section is further provided with at least one lateral electrocoil surface, the lateral electrocoil surface of the first section operable to sealably engage the lateral electrocoil surface of the second section.

16. The apparatus of claim 7, wherein the apparatus is further provided with an opening in the second section, the opening in communication with the cavity of the second section of the apparatus.

17. The apparatus of claim 16, wherein the opening is further defined as a saddle tap mounted on at least one of the first and second sections of the apparatus.

18. The apparatus of claim 17, wherein the saddle tap mounted on the apparatus is disposed adjacent the connection of the pipe.

19. The apparatus of claim 17, wherein the saddle tap mounted on the apparatus is substantially offset the connection of the pipe.

20. The apparatus of claim 17, wherein the first and second sections are provided with fasteners operable to sealably couple the first and second sections.

21. An apparatus for sealing a leak portion of a pipe fitted with a connection for transporting natural gas; the apparatus comprising:
   a first upper section having an electrocoil surface operable to sealingly engage a surface of the pipe;
   a first lower section having an electrocoil surface operable to sealingly engage the surface of the pipe, the first upper and lower sections adapted to matingly engage one another;
   a second upper section having an electrocoil surface operable to sealingly engage a surface of the pipe;
   a second lower section having an electrocoil surface operable to sealingly engage the surface of the pipe, the second upper and lower sections adapted to matingly engage one another;
   a first barrel section having a first end operable to sealingly engage the first upper section and a second end of the first barrel section operable to sealingly engage the second upper section when the first barrel section is positioned between the first and second upper sections; and
   a second barrel section having a first end operable to sealingly engage the first lower section and a second end of the second barrel section operable to sealingly engage the second lower section when the second barrel section is positioned between the first and second lower sections such that the first upper and lower sections, the second upper and lower sections and the first and second barrel sections are operable to encapsulate a portion of the pipe and the connection of the plastic pipe thereby sealing the leak portion.

22. The apparatus of claim 21, wherein the apparatus further includes at least one terminal mounted on at least one of the first and second upper and lower sections and first and second barrel sections, the terminal operable to energize the electrocoil surfaces of the first and second upper and lower sections to one another and to electrofuse the electrocoil surfaces of the first and second upper and lower sections to the surface of the pipe.

23. The apparatus of claim 22, wherein the pipe is polyethylene pipe.

24. The apparatus of claim 22, wherein the first upper section is further provided with at least one lateral electrocoil surface and wherein the first lower section is further provided with at least one lateral electrocoil surface, the lateral electrocoil surface of the first upper section operable to sealably engage the lateral electrocoil surface of the first lower section.

25. The apparatus of claim 24, wherein the second upper section is further provided with at least one lateral electrocoil surface and wherein the second lower section is further provided with at least one lateral electrocoil surface, the lateral electrocoil surface of the second upper section operable to sealably engage the lateral electrocoil surface of the second lower section.

26. The apparatus of claim 25, wherein the first barrel section is further provided with at least one lateral electrocoil surface and wherein the second barrel section is further provided with at least one lateral electrocoil surface, the lateral electrocoil surface of the first barrel section operable to sealably engage the lateral electrocoil surface of the second barrel section.

27. The apparatus of claim 26, wherein the first and second upper and lower sections and the first and second barrel sections of the apparatus operably encapsulate the pipe and the connection of the pipe and define a cavity within the apparatus.

28. The apparatus of claim 26, wherein the apparatus is further provided with an opening in the at least one of the first and second upper and lower sections and first and second barrel sections, the opening in communication with the cavity of the apparatus.

29. The apparatus of claim 28, wherein the opening is further defined as a saddle tap mounted on at least one of the first and second upper and lower sections and the first and second barrel sections of the apparatus.

30. The apparatus of claim 29, wherein the saddle tap mounted on the apparatus is disposed adjacent the connection on the pipe.

31. The apparatus of claim 29, wherein the saddle tap mounted on the apparatus is substantially offset the connection of the plastic pipe.

32. The apparatus of claim 29, wherein the first and second upper and lower sections and the first and second barrel sections are provided with fasteners operable to sealably couple the first upper and lower sections to one another, the second upper and lower sections to one another and the first and second barrel sections to one another.

33. A method of encapsulating a pipe fitted with a connection for transporting a fluid; the method comprising:
providing an apparatus including:
a first section having a first and second electrocoil surface operable to sealingly engage a surface of the pipe; and
a second section having a first and second electrocoil surface operable to sealingly engage the surface of the pipe, the second section operably sealable to at least the first section to encapsulate a portion of the pipe and the connection of the pipe; at least one terminal mounted on at least one of the first and second sections, the terminal operable to energize the electrocoil surfaces of the first and second sections to electrofuse the electrocoil surfaces of the first and second sections to the surface of the pipe; and
positioning the first section adjacent the pipe and the connection of the pipe;
positioning the second section adjacent the pipe and the connection of the pipe such that the first and second sections are disposed about the pipe and the connection so as to substantially encapsulate the pipe and connection; and
energizing the terminal on the apparatus so as to electrofuse the electrocoil surfaces of the first and second sections to the surface of the pipe thereby sealably encapsulating the connection of the pipe.

34. The method of claim 33, wherein the pipe is polyethylene pipe.

35. The method of claim 34, wherein the first section is further provided with at least one lateral electrocoil surface and wherein the second section is further provided with at least one lateral electrocoil surface, the lateral electrocoil surface of the first section operable to sealably engage the lateral electrocoil surface of the second section.

36. The method of claim 35, wherein the first and second sections of the apparatus encapsulate the pipe and the connection of the pipe defining a cavity within the apparatus, and wherein the apparatus is further provided with an opening in at least one of the first and second sections such that the opening communicates with the cavity of the apparatus.

37. The method of claim 36, wherein the opening is further defined as a saddle tap mounted on at least one of the first and second sections of the apparatus.

38. The method of claim 37, further includes preparing the pipe and the saddle tap for encapsulation.

39. The method of claim 38, wherein the preparation further includes repairing the connection of the pipe and invading the pipe.

40. The method of claim 33, wherein the pipe is further defined as a polyethylene pipe.

41. The method of claim 33, wherein the connection is a saddle tap.

42. The method of claim 33, wherein the connection is an integrated opening in the pipe.

43. The method of claim 33, wherein the connection is an opening in the pipe.

44. The method of claim 33, wherein the connection is a junction of the pipe.

45. The method of claim 33, wherein the connection is a connection of the pipe.

46. An apparatus for encapsulating a connection of a pipe, the apparatus comprising:
a first section having an electrocoil surface operable to sealingly engage a first portion of a surface of the pipe;
a second section having an electrocoil surface operable to sealingly engage a second portion of the surface of the pipe, wherein
the second section is further provided with an outer shell defining a cavity therein,
the second section has a clearance sufficient to encapsulate the pipe and the connection of the pipe when the second section is disposed about the surface of the pipe, and
the first and second sections are operably sealable to one another to encapsulate the connection of the pipe.

47. The apparatus of claim 46, wherein the connection is a saddle tap.

48. The apparatus of claim 46, wherein the connection is an integrated opening in the pipe.

49. The apparatus of claim 46, wherein the connection is an opening in the pipe.

50. The apparatus of claim 46, wherein the connection is a junction of the pipe.

51. The apparatus of claim 46, wherein the connection is a connection of the pipe.

52. The apparatus of claim 46, wherein
the electrocoil surface of the first section of the apparatus is further defined as a first end and second end electrocoil surfaces operable to sealingly engage the surface of the pipe, and
the electrocoil surface of the second section of the apparatus is further defined as a first end and second end electrocoil surfaces operable to sealingly engage the surface of the pipe.

53. An apparatus for encapsulating a connection of a pipe, the apparatus comprising:

a first section having an electrocoil surface operable to sealingly engage a first portion of a surface of the pipe;

a second section having an electrocoil surface operable to sealingly engage a second portion of the surface of the pipe, wherein the first and second sections are operably sealable to one another to encapsulate the pipe and the connection of the pipe defining a cavity within the apparatus, and at least one of the first and second sections includes an opening that communicates with the cavity of the apparatus.

54. The apparatus of claim 53, wherein the connection is a saddle tap.

55. The apparatus of claim 53, wherein the connection is an integrated opening in the pipe.

56. The apparatus of claim 53, wherein the connection is an opening in the pipe.

57. The apparatus of claim 53, wherein the connection is a junction of the pipe.

58. The apparatus of claim 53, wherein the connection is a connection of the pipe.

59. The apparatus of claim 53, wherein the electrocoil surface of the first section of the apparatus is further defined as a first end and second end electrocoil surfaces operable to sealingly engage the surface of the pipe, and the electrocoil surface of the second section of the apparatus is further defined as a first end and second end electrocoil surfaces operable to sealingly engage the surface of the pipe.

60. The apparatus of claim 53, wherein the second section is further provided with an outer shell defining a cavity therein, and the second section has a clearance sufficient to encapsulate the pipe and the connection of the pipe when the second section is disposed about the surface of the pipe.

* * * * *